(12) United States Patent
Tokuyoshi et al.

(10) Patent No.: US 12,633,045 B2
(45) Date of Patent: May 19, 2026

(54) MICROFACET SURFACE RENDERING

(71) Applicant: Advanced Micro Devices, Inc., Santa Clara, CA (US)

(72) Inventors: Yusuke Tokuyoshi, Tokyo (JP); Kenta Eto, Tokyo (JP)

(73) Assignee: Advanced Micro Devices, Inc., Santa Clara, CA (US)

( * ) Notice: Subject to any disclaimer, the term of this patent is extended or adjusted under 35 U.S.C. 154(b) by 116 days.

(21) Appl. No.: 18/488,807

(22) Filed: Oct. 17, 2023

(65) Prior Publication Data

US 2025/0124649 A1 Apr. 17, 2025

(51) Int. Cl.
*G06T 15/50* (2011.01)
*G06T 15/80* (2011.01)
(52) U.S. Cl.
CPC ............ *G06T 15/506* (2013.01); *G06T 15/80* (2013.01)
(58) Field of Classification Search
CPC ............................. G06T 15/506; G06T 15/80
See application file for complete search history.

(56) References Cited

U.S. PATENT DOCUMENTS

| | | | |
|---|---|---|---|
| 2009/0153557 A1* | 6/2009 | Dimitrov | .............. G06T 15/506 |
| | | | 345/426 |
| 2015/0379162 A1* | 12/2015 | MohammadBagher | ..................... |
| | | | G06F 30/00 |
| | | | 703/1 |
| 2018/0225865 A1* | 8/2018 | Lecocq | .................. G06T 15/80 |
| 2022/0335677 A1* | 10/2022 | Sun | ........................ G06T 15/506 |
| 2023/0316629 A1* | 10/2023 | Hulm | .................... G06T 15/005 |
| | | | 345/426 |
| 2025/0022214 A1* | 1/2025 | Guo | ........................ G06T 15/80 |

OTHER PUBLICATIONS

Dupuy, J. & Benyoub, A., "Sampling Visible GGX Normals with Spherical Caps", arXiv: 2306.05044v2 [cs.GR], The European Association for Computer Graphics, Eurographics, Jun. 12, 2023, 6 pgs.

\* cited by examiner

*Primary Examiner* — Said Broome
*Assistant Examiner* — Jordan Wan Yick
(74) *Attorney, Agent, or Firm* — Volpe Koenig

(57) ABSTRACT

A technique for rendering is provided. The technique includes obtaining one or more samples for a pixel, the samples obtained for a microfacet surface from a spherical cap cut off by a lower plane positioned to exclude reflected rays that are occluded by the microfacet surface; obtaining one or more contributions corresponding to the one or more samples; determining a color for the pixel based on the one or more contributions.

20 Claims, 5 Drawing Sheets

100

Interconnect 112

Processor 102

Auxiliary Device(s) 106

Auxiliary Processor(s) 114

APD 116

IO Devices 117

Memory 104

Storage 108

Geometry and Material
Information

Shader 402 → Shaded Pixels

Camera Information

400

Inverse of roughness parameter

700

Obtain one or more samples for a pixel

702

Obtain one or more contributions corresponding to one or more samples

704

Determine pixel color based on one or more contributions

706

MICROFACET SURFACE RENDERING

BACKGROUND

Three-dimensional graphics processing involves rendering three-dimensional scenes by converting models specified in a three-dimensional coordinate system to pixel colors for an output image. Improvements to three-dimensional graphics processing are constantly being made.

BRIEF DESCRIPTION OF THE DRAWINGS

A more detailed understanding may be had from the following description, given by way of example in conjunction with the accompanying drawings wherein.

DETAILED DESCRIPTION

A technique for rendering is provided. The technique includes obtaining one or more samples for a pixel, the samples obtained for a microfacet surface from a spherical cap cut off by a lower plane positioned to exclude reflected rays that are occluded by the microfacet surface; obtaining one or more contributions corresponding to the one or more samples; determining a color for the pixel based on the one or more contributions, for rendering is provided.

Figure 1:
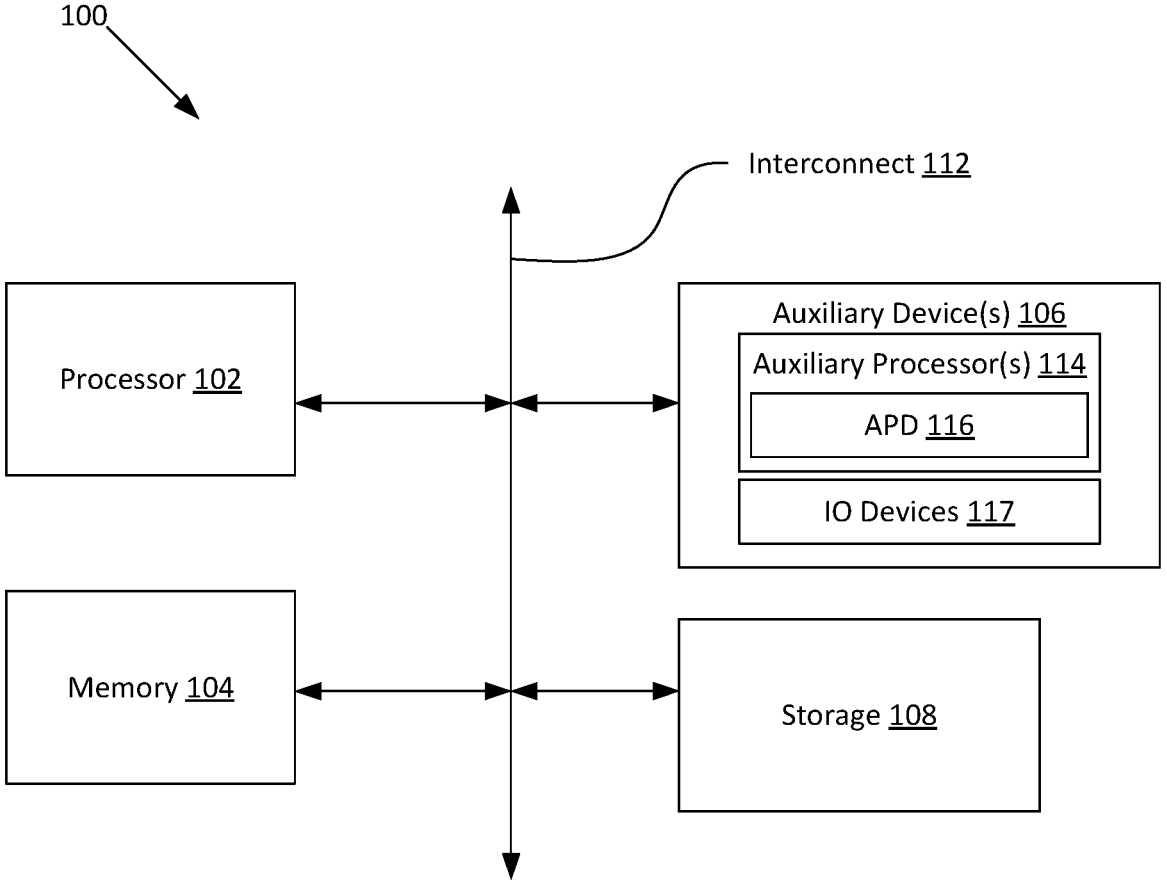
FIG. 1 is a block diagram of an example computing device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
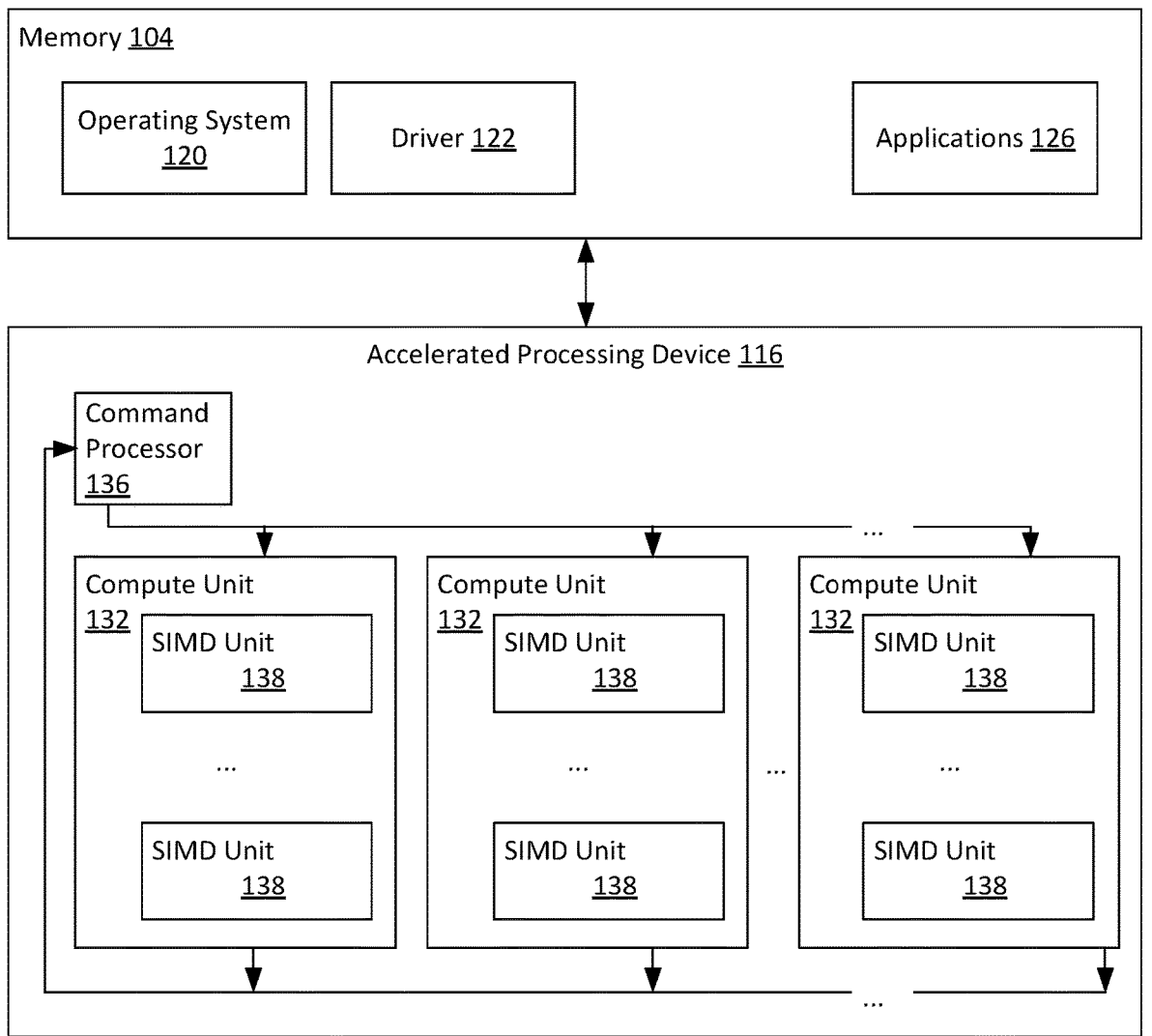
FIG. 2 illustrates details of the device of FIG. 1 and an accelerated processing device, according to an example.

FIG. 2 illustrates details of the device 100 and the APD 116, according to an example. The processor 102 (FIG. 1) executes an operating system 120, a driver 122 ("APD driver 122"), and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to a display device based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. A command processor 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
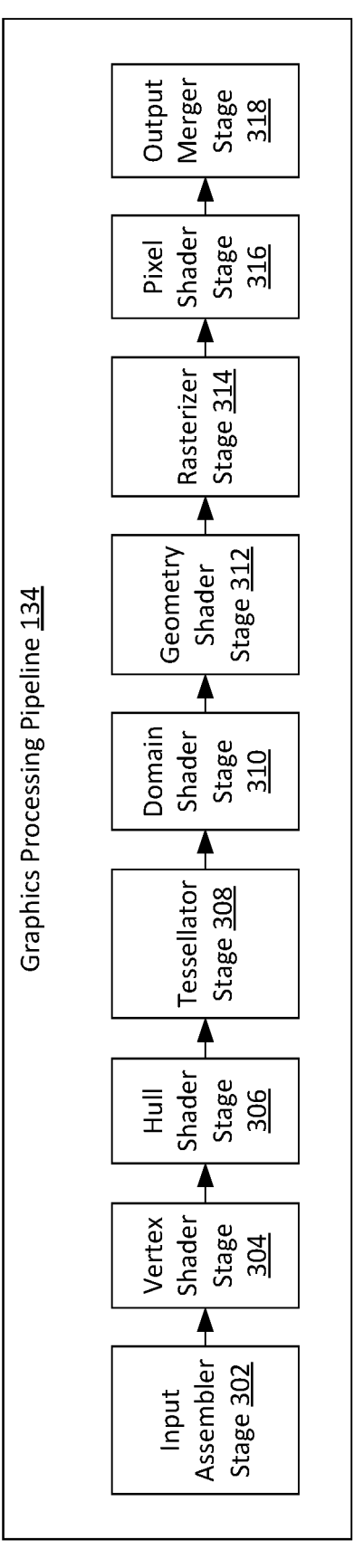
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

During rendering, a compute unit 132 executes a shader program to determine the colors for pixels of an image. In many circumstances, such execution involves evaluating a surface material for a surface. Surface materials can affect the appearance of surfaces, and a wide variety of surface materials exist.

A class of surface materials referred to as "GGX surfaces" is a type of surface that has a roughness parameter that specifies how simulated light rays are reflected from the surface. A GGX surface is modeled as a probability distribution of random microfacet normals. The microfacet model represents a large number of tiny bumps or "facets" as the "GGX" distribution function (where "GGX" stands for "ground glass unknown"). The GGX distribution is equal to the distribution of normals on an ellipsoid as follows:

$$D(m) = \frac{\chi(m_z)}{\pi a_x a_y \left( \frac{m_x^2}{a_x^2} + \frac{m_y^2}{a_y^2} + m_z^2 \right)^2}$$

where $m = [m_x, m_y, m_z]$ is the microfacet normal vector, $[\alpha_x, \alpha_y]$ is the roughness parameter to represent the ellipsoid whose semiaxes are $$\left[ \frac{1}{\alpha_x}, \frac{1}{\alpha_y}, 1 \right],$$

and $\chi$ is the Heaviside function, where the function is equal to 0 when the argument is negative and 1 when the argument is positive. Rendering such a surface involves sampling from a representative set of locations on such a surface. Performing such sampling in a "correct" or aesthetically pleasing manner involves sampling from a sampling distribution that correctly accounts for the "importance" of different regions on the surface. The sampling problem is relatively difficult due to the relatively non-regular, "bumpy" nature of the surface. For example, if a camera is viewing the surface at an angle, certain positions can never be viewed by that camera. In addition, to produce high quality results, it is important to have an appropriate sample distribution that does not inaccurately skew towards certain geometric features of the surface.

Thus, a sampling technique is provided herein for sampling microfacet material surfaces. In general, the sampling technique involves sampling uniformly from a spherical surface that is cut by a lower plane. This shape represents all of the possible reflected directions, where the reflected directions represent the direction of reflection of rays (cast from the point of view of a camera) incident on the microfacet surface. As the surface is, again, represented by a distribution of microfacets, the direction of reflection varies a great deal. The position of the lower plane excludes a large portion of light rays that would not visibly contribute to the final image. More specifically, some directions could be impossible due to being on the far side of a bump from the point of view of the camera. Other directions will be occluded by the microfacet surface itself (for example, a ray could be reflected by a bump towards another part of the microfacet surface itself). Excluding many or most of these non-visible rays would improve the rendering process by requiring less work to obtain a properly representative set of samples. It is possible that not all such directions are excluded, but excluded at least some of the directions that are occluded by the microfacet surface improves the appearance by reducing noise.

Figure 4:
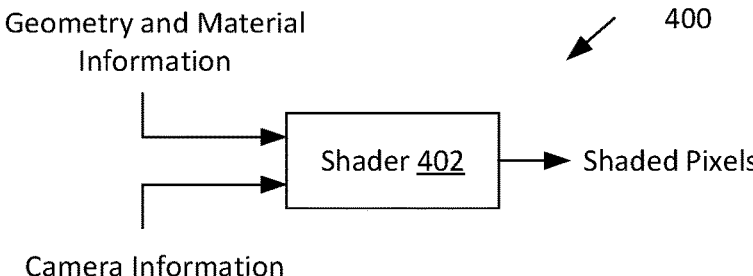
FIG. 4 illustrates a system for rendering an image based on scene geometry that includes a microfacet material, according to an example.

FIG. 4 illustrates a system 400 for rendering an image based on scene geometry that includes a microfacet material, according to an example. The system 400 includes a shader 402 that accepts geometry and material information and camera information, processes that information, and generates shaded pixels. In various examples, the shader 402 is a pixel shader program of a pixel shader stage 316, is a material shader of a ray tracing system, or is any other entity capable of rendering a surface having a microfacet material. In various examples, the shader 402 is software executing on a processor, hardware (e.g., circuitry, such as a processor, including a programmable processor, fixed function processor, microcontroller, configurable logic network, field programmable gate array, or any other processor, or hard-wired circuitry), or a combination of software and hardware. Although operations are described as being performed by a "shader 402" herein, it should be understood that any system could perform the steps. Such a system could include a processor that performs the operations of the shader 402 and a memory storing instructions for the processor and/or storing any or all of the data processed by or generated by the processor.

In some examples, to render a pixel, the shader 402 samples the surface a number of times, where sampling the surface includes at least obtaining a reflected direction of the ray cast from the camera. The reflected direction varies by position due to the geometry of the microfacets. The shader 402 then shades the pixel using these reflected directions. In various examples, the shader 402 determines a light contribution from objects in the direction of the reflections, and integrates those light contributions as the color for the pixel. A surface roughness parameter varies the roughness of the surface, which increases or decreases the size of the microfacets. A higher roughness means more light scattering, with a resulting visual effect (e.g., the surface produces less coherent reflections), since the sampled surface normals vary to a greater degree.

Figure 5:
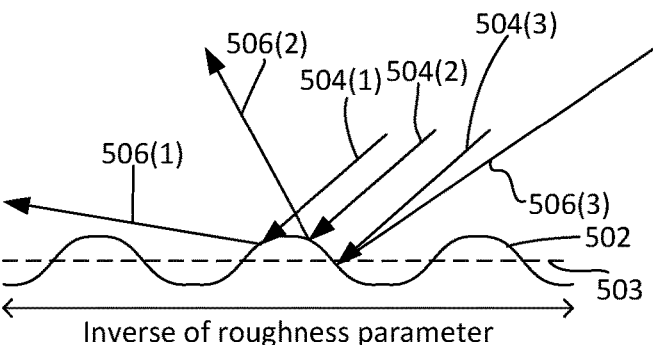
FIG. 5 illustrates examples of reflected rays that are associated with sampling a microfacet surface material, according to an example.

FIG. 5 illustrates examples of reflected rays that are associated with sampling a microfacet surface material 502, according to an example. More specifically, as described above, rendering a pixel for a microfacet surface involves sampling the surface one or more times. Each sample results in a selection of a ray that is reflected in a particular direction, where that direction is dependent on the shape of the microfacet surface. In an example, the shader performs sampling of this microfacet surface material 502 by randomly selecting one or more reflected directions. In other words, the shader 402 selects, from a distribution of possible reflected directions, one reflected direction for each sample. The chance for any particular reflected direction being selected is dictated by a probability distribution. Thus it can be said that the shader 402 samples from the probability distribution to select a ray. The shader 402 uses the selected ray according to any technically feasible means such as by determining a light contribution to the pixel based on what object (if any) is found at the end of the reflected ray.

In the example of FIG. 5, multiple incident rays 504 are shown incident on the microfacet surface material 502. A first incident ray 504(1) has a reflected ray 506(1) with a low angle dictated by the angle of the microfacet surface 502 at the point of contact. A second incident ray 504(2) has a reflected ray 506(2) with a steep reflected angle. A third incident ray 504(3) has a reflected ray 506(3) that propagates in a reverse direction.

Figure 6:
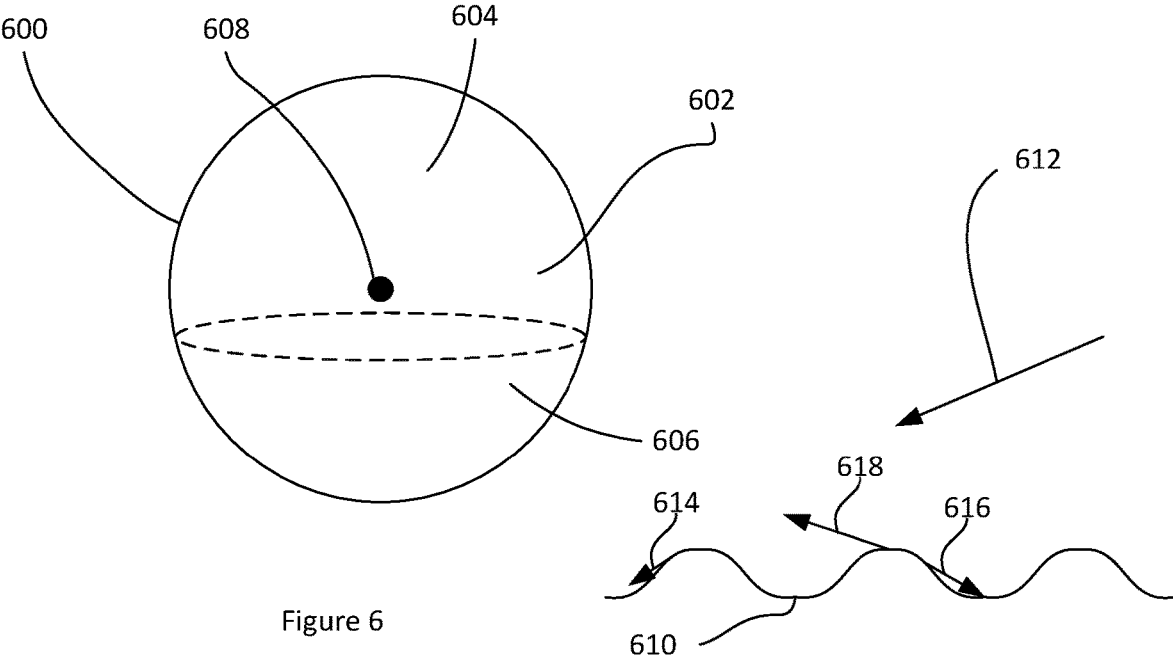
FIG. 6 illustrates a spherical sampling distribution 600, according to an example.

Performing sampling is not straightforward. One challenge is the need to sample from different locations on the microfacet surface to obtain an appropriately representative set of rays. To overcome this challenge, a sampling technique first uniformly samples a reflection direction within a spherical cap in a stretched space whose roughness parameter is stretched to 1, and then transforms the reflected ray to the original space whose roughness parameter is the given material's roughness parameter. The spherical cap has a planar limit, as described with respect to FIG. 6. More specifically, FIG. 6 illustrates a spherical sampling distribution 600, according to an example. This distribution represents a set of possible reflected ray directions. The sampling distribution 600 is limited by a planar boundary 602. The planar boundary 602 defines an included zone 604 above the planar boundary 602 and an excluded zone 606 below the planar boundary 602. To perform sampling, the shader 402 samples uniformly from the from included zone 604. More specifically, the sampling randomly selects, with equal probability, one of the points on the spherical surface within the included zone 604. The sampled reflected vector is thus defined as a vector between the center 608 of the sphere and the selected point on the spherical surface within the included zone 604. Note that the sampling does not sample from the excluded zone 606. Once the reflected vector is sampled, the shader 402 "works backwards" to find the direction of the incident ray and/or the point on the microfacet surface 502 hit by that ray.

An example microfacet surface 610 is illustrated. For a given view angle 612, there exists reflected directions that are "beyond the horizon" of a microfacet bump (such as direction 614), reflected directions that result in a collision with the surface 610 itself (such as direction 616 or direction 618), and directions that are neither of those. The first two types are those that are excluded by the planar boundary 602 and the last type is of the type that is within the included zone 604. More specifically, the planar boundary 602 excludes at least some directions that are occluded by the microfacet surface 610 itself, where such directions are not already excluded by a planar boundary that excludes all rays that are beyond the horizon of a microfacet bump. In other words, it is possible to select a planar boundary that excludes all reflected directions that are beyond such a horizon. However, such a planar boundary would include some reflected directions that are not beyond the horizon but that are occluded by the microfacet surface 610. The planar boundary 602 provided herein is positioned to exclude both the reflected directions that are beyond the horizon as well as reflected directions that are not beyond the horizon but are occluded by the microfacet surface 610.

It should be understood that the normal of the planar boundary 602 is perpendicular to the "base surface" 503 which is a plane that characterizes the microfacet surface. In other words, the base surface 503 is a plane along with the microfacets of the microfacet surface are located.

It is possible to express the probability distribution function-which describes the probabilities for selecting particular reflected ray directions-mathematically. This expression is as follows:

$$p = \frac{2D(m)\max(i \cdot m, 0)}{k i_z + \sqrt{a_x^2 i_x^2 + a_y^2 i_y^2 + i_z^2}} \chi(k i_z' + o_z')$$

In this expression, D(m) is the GGX distribution function of microfacet normals and is equal to:

$$\frac{\chi(m_z)}{\pi a_x a_y \left( \frac{m_x^2}{a_x^2} + \frac{m_y^2}{a_y^2} + m_z^2 \right)^2}$$

In these expressions, $\alpha_x, \alpha_y$ is the roughness parameter, $\chi$ is the Heaviside function, where the function is equal to 0 when the argument is negative and 1 when the argument is positive. $i_z'$ is the z component of the incoming direction in the stretched space and $o_z'$ is the z component of the reflected direction in the stretched space. The stretched space is a modification to space that "normalizes" the coordinate space of the incoming and reflected vectors by an amount that would result in the microfacet surface having a roughness parameter of 1. The inverse of the roughness parameter includes stretching factors for x-axis and y-axis from the "normalized" space for the GGX microfacet surface. The stretching adjusts the incoming direction and microfacet normal by a proportionate amount to what is required to make the roughness parameter 1. m is an unstretched microfacet normal. Specifically, m is obtained as follows: (1) stretch the incoming direction i to i':

$$\frac{[a_x i_x, a_y i_y, i_z]}{\|a_x i_x, a_y i_y, i_z\|};$$

(2) sample o' on the spherical cap (the included zone 604); (3) compute the half vector m'=(i'+o')/‖i'+o'‖; 4) compute the unstretched microfacet normal:

$$m = \frac{[a_x m\prime_x, a_y m\prime_y, m\prime_z]}{\|a_x m\prime_x, a_y m\prime_y, m\prime_z\|}.$$

In these expressions, max( ) is the maximum of the two parameters to the function (so maximum of i·m). i is a vector that represents the incoming direction (e.g., the view direction from the point of view of the camera), m is a vector that represents the microfacet normal direction, and the · symbol represents the dot product. k is equal to:

$$\frac{(1-\alpha^2)s^2}{s^2+\alpha^2 i_z^2}$$

Where $\alpha=\alpha_x=\alpha_y$ if $\alpha_x=\alpha_y$. When $\alpha_x\neq\alpha_y$, $\alpha=\min(\alpha_x,\alpha_y,1)$ or in other words, the minimum of the roughness parameters (which specifies the roughness of the microfacet surface material, where the inverse of the roughness can be thought of as stretching factors for x-axis and y-axis of the micro-surface), where s is equal to $$1+\text{sgn}(1-\alpha)\sqrt{i_x^2+i_y^2}\,.$$

In the case that $\alpha_x=\alpha_y$, it is said that the roughness of the microfacet surface is isotropic and if $a_x$ is not equal to $a_y$, the roughness is anisotropic. As can be seen, k is based on the roughness parameter, meaning that the position of the plane is based on the roughness parameter. Here, sgn is the sign function that is −1 if its parameter is negative, +1 if positive, and 0 if zero. $i_x$ and $i_y$ are the x and y components, respectively, of the incoming vector direction.

It can be seen that obtaining a reflected vector occurs by sampling the spherical cap (which is in the stretched space). The spherical cap is defined by a spherical surface cut off by a lower planar boundary 602. In the situation that $i_z<0$, the position of the lower plane is $-i'_z$. In the situation that $i_z>=0$, the position of the lower plane is $-ki'_z$, where k is as defined above, and where the coordinate system begins at the center of the spherical cap. Again, this lower plane is positioned to exclude both the rays that are beyond the horizon as well as rays that collide with the microfacet surface. As the spherical cap exists in the stretched space, to obtain the final reflected direction requires unstretching the sampled direction. Again, stretching and unstretching is based on the roughness param-eters $\alpha_x$ and $\alpha_y$.

Figure 7:
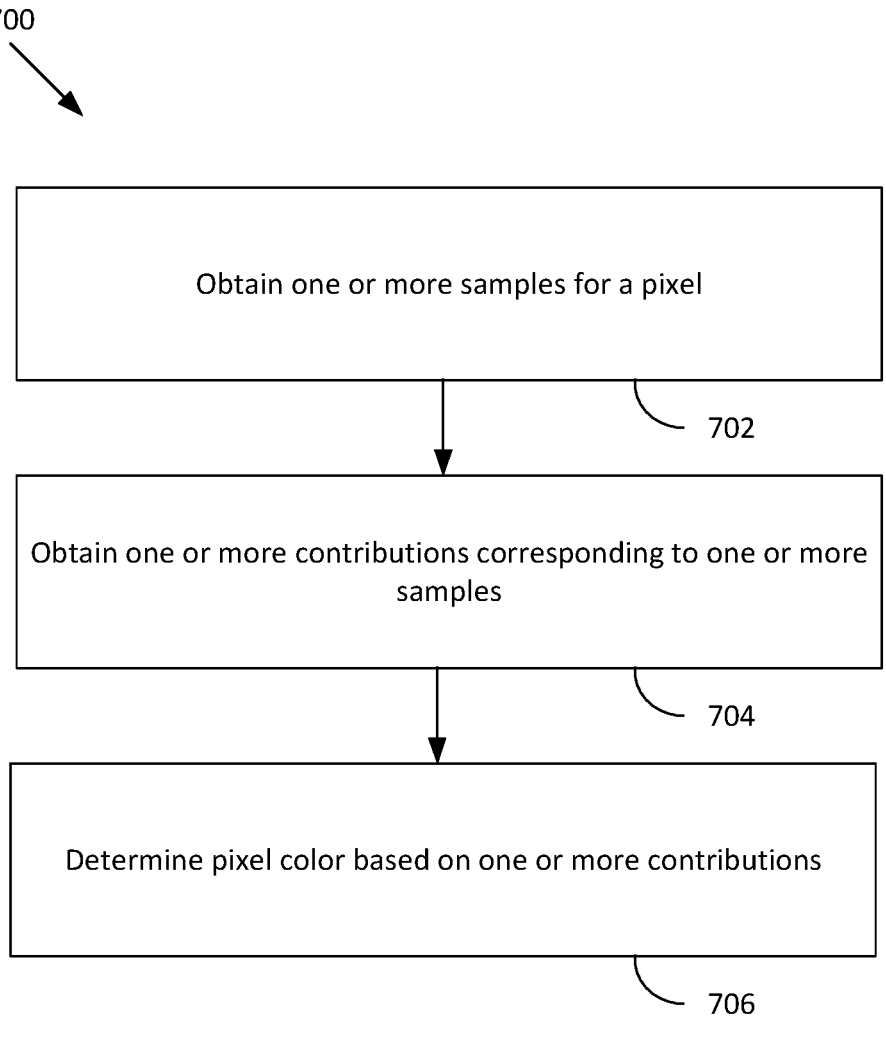
FIG. 7 is a flow diagram of a method for performing rendering for a microfacet surface, according to an example.

FIG. 7 is a flow diagram of a method 700 for performing rendering for a microfacet surface, according to an example. Although described with respect to the system of FIGS. 1-6, those of skill in the art will understand that any system configured to perform the steps of the method 700 in any technically manner falls within the scope of the present disclosure.

At step 702, a shader 402 obtains one or more samples for a pixel. The one or more samples are for a pixel for which a microfacet surface is in view. A camera is directed towards the microfacet surface, and the view angle, relative to the normal of the microfacet surface, defines how the sampling occurs. The sampling obtains one or more reflection direc-tions that define how light rays from the point of view of the camera reflect into the environment.

Sampling occurs by sampling uniformly (e.g., with equal probability) from a spherical cap cut off by a lower plane as described elsewhere herein. The lower plane is positioned to exclude rays that are past the horizon of the bumps as well as rays that will intersect the microfacet surface. As the spherical cap is in a stretched space in which the roughness parameter is 1, the resulting sampled direction is trans-formed by the shader 402.

At step 704, the shader 402 obtains one or more contri-butions corresponding to the one or more samples. The shader 402 performs this operation in any technically feasible manner. In some examples, the shader 402 finds an object or entity at the end of the sampled reflected direction and determines the contribution based on that object or entity. In an example, an object at the end of the reflected direction has a white color and contributes that color to the color of the pixel.

At step 706, the shader 402 determines a pixel color based on one or more of such contributions. In some examples, the shader 402 combines (e.g., adds, averages, or otherwise combines) all such contributions from all such samples to determine the color for the pixel.

It should be understood that many variations are possible based on the disclosure herein. Although features and ele-ments are described above in particular combinations, each feature or element can be used alone without the other features and elements or in various combinations with or without other features and elements.

Each of the units illustrated in the figures represent hardware circuitry configured to perform the operations described herein, software configured to perform the opera-tions described herein, or a combination of software and hardware configured to perform the steps described herein. For example, the processor 102, memory 104, any of the auxiliary devices 106, the storage 108, the command pro-cessor 136, compute units 132, SIMD units 138, input assembler stage 302, vertex shader stage 304, hull shader stage 306, tessellator stage 308, domain shader stage 310, geometry shader stage 312, rasterizer stage 314, pixel shader stage 316, or output merger stage 318, and shader 402 are implemented fully in hardware, fully in software executing on processing units, or as a combination thereof. In various examples, any of the hardware described herein includes any technically feasible form of electronic circuitry hardware, such as hard-wired circuitry, programmable digital or analog processors, configurable logic gates (such as would be present in a field programmable gate array), application-specific integrated circuits, or any other technically feasible type of hardware.

The methods provided can be implemented in a general purpose computer, a processor, or a processor core. Suitable processors include, by way of example, a general purpose processor, a special purpose processor, a conventional pro-cessor, a digital signal processor (DSP), a plurality of microprocessors, one or more microprocessors in associa-tion with a DSP core, a controller, a microcontroller, Appli-cation Specific Integrated Circuits (ASICs), Field Program-mable Gate Arrays (FPGAs) circuits, any other type of integrated circuit (IC), and/or a state machine. Such proces-sors can be manufactured by configuring a manufacturing process using the results of processed hardware description language (HDL) instructions and other intermediary data including netlists (such instructions capable of being stored on a computer readable media). The results of such process-ing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering, the method comprising:

obtaining one or more samples for a pixel, the samples obtained for a microfacet surface from a spherical cap cut off by a lower plane positioned to exclude reflected rays that are occluded by the microfacet surface and reflected rays that are beyond a horizon of a microfacet bump of the microfacet surface;

obtaining one or more contributions corresponding to the one or more samples; and determining a color for the pixel based on the one or more contributions.

2. The method of claim 1, wherein roughness for the microfacet surface is isotropic and the lower plane is positioned based on a roughness parameter corresponding to the roughness.

3. The method of claim 1, wherein the lower plane is a distance from a top of the spherical cap, where the top is in a direction of a normal of a base surface of the microfacet surface.

4. The method of claim 3, wherein the distance is based on a roughness parameter for the microfacet surface.

5. The method of claim 4, wherein the distance is also based on a direction of an incoming ray.

6. The method of claim 1, wherein the one or more samples comprise one or more reflected directions.

7. The method of claim 1, wherein a z component of an incoming direction is below an origin of the spherical cap and the lower plane position is not based on roughness of the microfacet surface.

8. The method of claim 1, wherein the sampling includes selecting a point from an included portion of a spherical cap.

9. The method of claim 1, wherein the determining the color comprises combining the one or more contributions.

10. A system for rendering, the system comprising:

a memory configured to store data for a pixel; and a processor configured to obtain one or more samples for the pixel, the samples obtained for a microfacet surface from a spherical cap cut off by a lower plane positioned to exclude reflected rays that are occluded by the microfacet surface and reflected rays that are beyond a horizon of a microfacet bump of the microfacet surface;

obtain one or more contributions corresponding to the one or more samples; and determine a color for the pixel based on the one or more contributions.

11. The system of claim 10, wherein roughness for the microfacet surface is isotropic and the lower plane is positioned based on a roughness parameter corresponding to the roughness.

12. The system of claim 10, wherein the lower plane is a distance from a top of the spherical cap, where the top is in a direction of a normal of a base surface of the microfacet surface.

13. The system of claim 12, wherein the distance is based on a roughness parameter for the microfacet surface.

14. The system of claim 13, wherein the distance is also based on a direction of an incoming ray.

15. The system of claim 10, wherein the one or more samples comprise one or more reflected directions.

16. The system of claim 10, wherein a z component of an incoming direction is below an origin of the spherical cap and the lower plane position is not based on roughness of the microfacet surface.

17. The system of claim 10, wherein the sampling includes selecting a point from an included portion of a spherical cap.

18. The system of claim 10, wherein the determining the color comprises combining the one or more contributions.

19. A non-transitory computer-readable medium storing instructions that, when executed by a processor, cause the processor to perform operations comprising:

obtaining one or more samples for a pixel, the samples obtained for a microfacet surface from a spherical cap cut off by a lower plane positioned to exclude reflected rays that are occluded by the microfacet surface and reflected rays that are beyond a horizon of a microfacet bump of the microfacet surface;

obtaining one or more contributions corresponding to the one or more samples; and determining a color for the pixel based on the one or more contributions.

20. The non-transitory computer-readable medium of claim 19, wherein roughness for the microfacet surface is isotropic and the lower plane is positioned based on a roughness parameter corresponding to the roughness.

* * * * *